(12) United States Patent
Kashiki et al.

(10) Patent No.: US 7,703,659 B2
(45) Date of Patent: Apr. 27, 2010

(54) FRICTION STIR JOINING APPARATUS

(75) Inventors: Hajime Kashiki, Kobe (JP); Yasuhide Nagao, Kobe (JP); Masayuki Inuzuka, Ikeda (JP); Takehiro Hyoue, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 12/289,240

(22) Filed: Oct. 23, 2008

(65) Prior Publication Data

US 2009/0057371 A1 Mar. 5, 2009

Related U.S. Application Data

(62) Division of application No. 10/206,336, filed on Jul. 29, 2002, now abandoned.

(30) Foreign Application Priority Data

Jul. 30, 2001 (JP) ............... 2001-230336

(51) Int. Cl.
*B23K 20/12* (2006.01)
*B23K 37/00* (2006.01)

(52) U.S. Cl. ........................ 228/112.1; 228/8

(58) Field of Classification Search ........... None
See application file for complete search history.

(56) References Cited

U.S. PATENT DOCUMENTS

| | | | |
|---|---|---|---|
| 2,712,838 A | 7/1955 | Luke | |
| 4,317,176 A | 2/1982 | Saar et al. | |
| 5,460,317 A | 10/1995 | Thomas et al. | |
| 5,697,544 A | 12/1997 | Wykes | |
| 5,718,366 A * | 2/1998 | Colligan | 228/112.1 |
| 5,813,592 A | 9/1998 | Midling et al. | |
| 5,893,507 A * | 4/1999 | Ding et al. | 228/2.1 |
| 6,050,474 A | 4/2000 | Aota et al. | |
| 6,050,475 A | 4/2000 | Kinton et al. | |
| 6,053,391 A | 4/2000 | Heideman et al. | |
| 6,102,636 A * | 8/2000 | Geise | 409/231 |
| 6,199,745 B1 * | 3/2001 | Campbell et al. | 228/112.1 |
| 6,247,633 B1 | 6/2001 | White et al. | |
| 6,299,050 B1 * | 10/2001 | Okamura et al. | 228/110.1 |
| 6,302,315 B1 | 10/2001 | Thompson | |
| 6,367,681 B1 | 4/2002 | Waldron et al. | |
| 6,450,394 B1 * | 9/2002 | Wollaston et al. | 228/112.1 |
| 6,450,395 B1 | 9/2002 | Weeks et al. | |
| 6,497,335 B2 | 12/2002 | Low et al. | |
| 6,497,355 B1 * | 12/2002 | Ding et al. | 228/2.1 |
| 6,499,649 B2 * | 12/2002 | Sayama et al. | 228/112.1 |

(Continued)

FOREIGN PATENT DOCUMENTS

DE 197 31 638 A1 7/1998

(Continued)

*Primary Examiner*—Kiley Stoner
(74) *Attorney, Agent, or Firm*—Oliff & Berridge, PLC

(57) ABSTRACT

In the friction stir joining apparatus of the present invention, a rotation control unit variably controls a rotational speed of a rotor; and a straight movement control unit controls a straight movement of the rotor so as to control a pressure applied by the rotor to the object. The tip portion of the rotating rotor is pressed against a workpiece, thus spot joining is executed. The apparatus can execute frictional stirring joining without practical trouble under simple control.

5 Claims, 4 Drawing Sheets

U.S. PATENT DOCUMENTS

| | | |
|---|---|---|
| 6,536,651 B2 | 3/2003 | Ezumi et al. |
| 6,585,443 B2 | 7/2003 | Aota et al. |
| 6,601,751 B2 | 8/2003 | Iwashita |
| 6,604,667 B2 | 8/2003 | Schilling et al. |
| 6,685,081 B2 * | 2/2004 | Iwata ................... 228/112.1 |
| 6,722,556 B2 | 4/2004 | Schilling et al. |
| 6,729,526 B2 * | 5/2004 | Okamoto et al. .......... 228/2.1 |
| 6,789,722 B2 * | 9/2004 | Murakami ............. 228/112.1 |
| 6,811,632 B2 * | 11/2004 | Nelson et al. ............ 156/73.5 |
| 6,832,713 B2 * | 12/2004 | Kano et al. ................ 228/2.1 |
| 6,908,690 B2 * | 6/2005 | Waldron et al. ............ 428/615 |
| 7,455,210 B2 * | 11/2008 | Nagao et al. ............ 228/112.1 |
| 2001/0045447 A1 * | 11/2001 | Kano et al. ............. 228/112.1 |
| 2001/0052561 A1 * | 12/2001 | Wollaston et al. ........... 244/132 |
| 2002/0027155 A1 * | 3/2002 | Okamura et al. ......... 228/112.1 |
| 2003/0029903 A1 | 2/2003 | Kashiki et al. |
| 2003/0141343 A1 * | 7/2003 | Murakami ............. 228/112.1 |
| 2004/0112939 A1 | 6/2004 | Nagao et al. |
| 2005/0050508 A1 * | 3/2005 | Gore et al. ................... 716/12 |

FOREIGN PATENT DOCUMENTS

| | | |
|---|---|---|
| DE | 199 53 260 A | 5/2001 |
| EP | 1149656 A2 | 10/2001 |
| JP | A-10-183316 | 7/1998 |
| JP | A-11-226758 | 8/1999 |
| JP | A-2000-015426 | 1/2000 |
| JP | A-2002-045980 | 2/2002 |
| JP | A-2002-066759 | 3/2002 |
| JP | A-2002-120077 | 4/2002 |
| JP | A-2002-292477 | 10/2002 |
| SU | 1271676 A | 11/1986 |
| WO | WO 98/04381 | 2/1998 |
| WO | WO 99/54081 | 10/1999 |
| WO | WO 01/36144 A1 | 5/2001 |
| WO | WO 02/078894 A1 | 10/2002 |

* cited by examiner

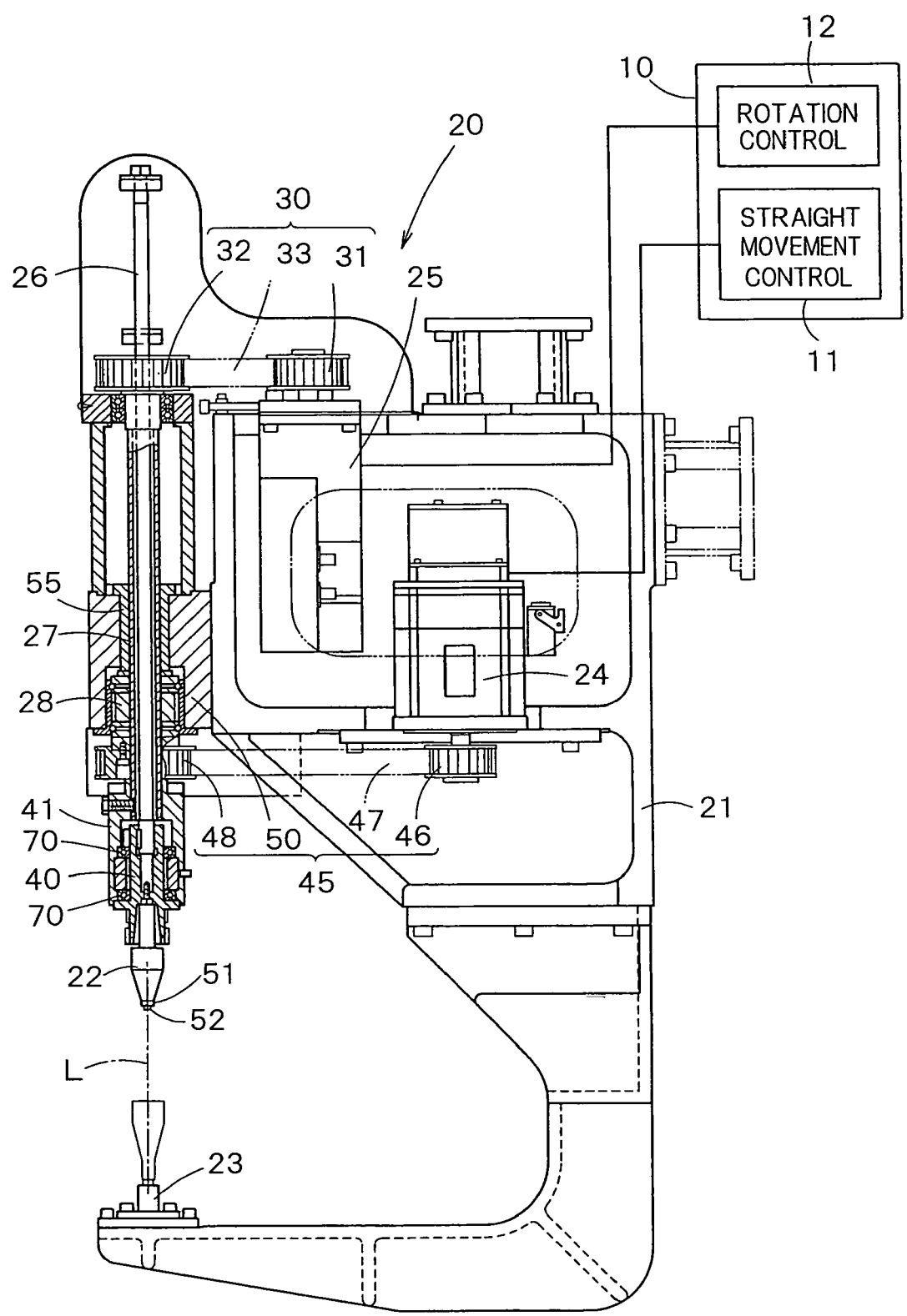
F I G. 1

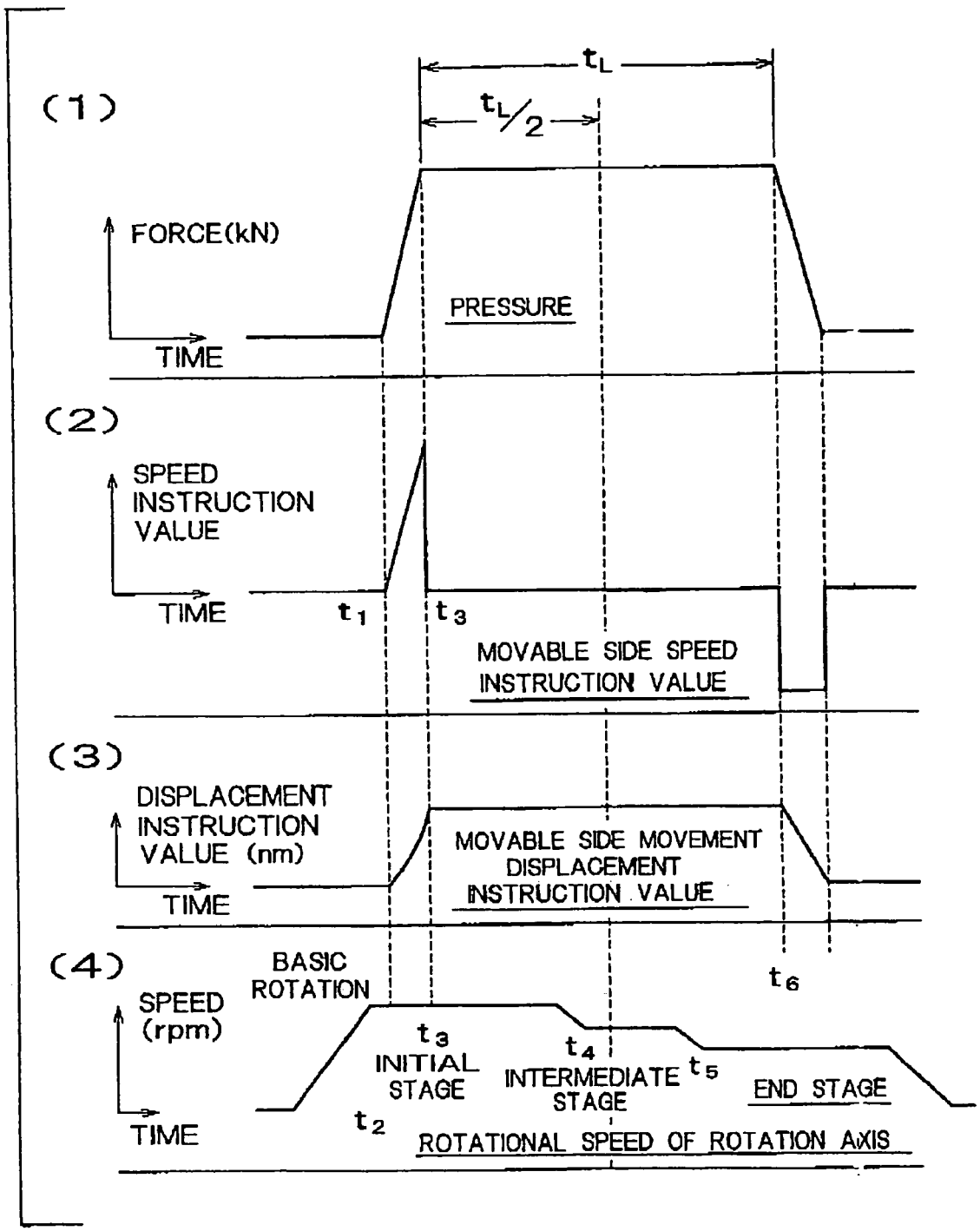
F I G. 4

FRICTION STIR JOINING APPARATUS

CROSS-REFERENCE TO RELATED APPLICATIONS

This is a Division of application Ser. No. 10/206,336 filed Jul. 29, 2002, now abandoned. The disclosure of the prior application is hereby incorporated by reference herein in its entirety.

BACKGROUND

1. Field of the Invention

The present invention relates to a friction stir joining apparatus for softening, stirring, and joining an object to be joined by frictional heat due to rotation, and a method of controlling the friction stir joining apparatus.

2. Description of the Related Art

There are some methods for joining an aluminum body of a car such as aluminum spot welding and rivet joining. However, problems are imposed that the piping and utility of a robot machine are complicated and the operational environment is bad such as large noise and generation of sparks. In view of the above problems, a spot joining apparatus using friction stir joining method is proposed.

The friction stir joining method presses a workpiece, which is an object to be joined, by rotating a rotor having a pin at its distal end at high speed and executes spot joining by frictional stirring.

A spot joining apparatus using friction stir joining method can be applied to an existing spot welding gun which is used for resistance welding. However, in the spot welding using the spot welding gun, an electrode of the spot welding gun is not rotated. Accordingly, the conventional spot welding control method for the spot welding gun cannot be directly applied to the spot joining apparatus using friction stir joining method.

Further, the conventional spot welding gun servo-controls pressure. Namely, the gun detects pressure in real time during the joining operation and feedback-controls it so as to generate a motor current according to the pressure. This control provides no particular trouble in the welding quality as the conventional spot welding control.

On the other hand, the friction stir joining method has a peculiar behavior property due to a phenomenon relating to frictional heat like frictional stirring, and definition and explication thereof are just started by the persons concerned, and a control method for friction stir joining method is not proposed yet.

Accordingly, a method for applying the existing servo control for a conventional spot welding may be considered as control for a friction stir joining method. Namely, the method monitors the rotational speed in real time during the joining operation and feedback-controls it so as to always obtain a most suitable rotational speed. Furthermore, a method for also monitoring the pressure in real time and feedback-controlling it so as to always obtain most suitable pressure may be considered. However, such servo-control for the rotational speed and pressure is extremely complicated and realization thereof is difficult.

The present invention is intended to provide a friction stir joining apparatus and a method for controlling the same for executing frictional stirring spot joining without practical trouble under simple control.

SUMMARY

A friction stir joining apparatus according to the present invention comprises: a rotor having a tip portion; a rotation motor for rotating said rotor about a rotation axis; a straight movement motor for moving said rotor along said rotation axis, said tip portion of a rotating rotor being pressed against an object to be joined so that said object is softened and stirred by a frictional heat at a contact between said tip portion and said object; a rotation control unit for variably controlling a rotational speed of said rotor; and a straight movement control unit for controlling a straight movement of said rotor so as to control a pressure applied by said rotor to said object.

Preferably, the friction stir joining apparatus further comprises: a support member fixedly supporting said rotation motor and said straight movement motor, said rotor being supported by said support member so as to be able to rotate about and move along said rotation axis; a rotation transmitting unit for transmitting a rotary power from said rotation motor to said rotor while allowing said rotor to move along said rotation axis; and a straight movement transmitting unit for transmitting a straight movement power from said straight movement motor to said rotor while allowing said rotor to rotate about said rotation axis.

Preferably, the friction stir joining apparatus further comprises: a receiver fixedly mounted on said support member so as to receive said object which is positioned between said rotor and said receiver; and a rotation shaft extending along said rotation axis, said rotor being mounted on said rotation shaft, said rotation transmitting unit transmitting said rotary power from said rotation motor to said rotation shaft while allowing said rotation shaft to move along said rotation axis; and said straight movement transmitting unit includes: a screw shaft of hollow shape for moving said rotor straight, said rotation shaft being inserted in said screw shaft; and a nut member rotatably supported by said support member and screwed on said screw shaft so as to form a ball screw, said nut member being configured to be rotated by said straight movement motor.

Preferably, by use of at least one of said rotation control unit and said straight movement control unit, said apparatus detects whether said tip portion of said rotor is joined with said object due to fusion.

Preferably, said rotation control unit during a joining operation detects whether said rotational speed of said rotor is within a predetermined range of rotational speed or not and when said rotation control unit judges that said rotational speed is not within said predetermined range of rotational speed, said rotation control unit stops said joining operation.

Preferably, said straight movement control unit during a joining operation detects whether pressure is within a predetermined range of pressure or not and when said straight movement control unit judges that said pressure is not within said predetermined range of pressure, said straight movement control unit stops said joining operation.

Preferably, said rotation control unit changes said rotational speed of said rotor during a joining operation.

Preferably, said straight movement control unit outputs in an early stage of said joining operation a speed instruction value of triangular wave shape having an inclined wave portion which increases said rotation speed of said rotor with time.

Preferably, said straight movement control unit changes said pressure during a joining operation.

Preferably, said rotation control unit changes said rotational speed of said rotor during a joining operation; and said straight movement control unit changes said pressure during said joining operation.

Preferably, said rotation control unit changes said rotational speed of said rotor with time during said joining operation.

Preferably, said rotation control unit changes said rotational speed of said rotor during said joining operation so as to decrease said rotation speed of said rotor with time.

Preferably, said rotation control unit changes said rotational speed of said rotor during said joining operation so as to increase said rotation speed of said rotor with time.

Preferably, said rotation control unit changes said rotational speed of said rotor during said joining operation so that said rotational speed is set at high speed, low speed, and high speed in this order with time.

Preferably, said rotation control unit controls said rotational speed of said rotor during said joining operation so that said rotational speed is changed in steps or continuously with time.

Preferably, said straight movement control unit outputs in an early stage of said joining operation a speed instruction value of a wave shape having an inclined wave portion which increases said rotation speed of said rotor with time.

Preferably, said wave shape of said speed instruction is triangular.

A method of controlling a friction stir joining apparatus including a rotor having a tip portion; a rotation motor for rotating said rotor about a rotation axis; a straight movement motor for moving said rotor along said rotation axis, said tip portion of a rotating rotor being pressed against an object to be joined so that said object is softened and stirred by a frictional heat at a contact between said tip portion and said object according to the present invention, comprises: a rotation control step of variably controlling a rotational speed of said rotor using a rotation control unit; and a straight movement control step of controlling a straight movement of said rotor so as to control a pressure applied by said rotor to said object using a straight movement control unit.

Preferably, said friction stir joining apparatus further comprises a support member fixedly supporting said rotation motor and said straight movement motor, said rotor being supported by said support member so as to be able to rotate about and move along said rotation axis; a rotation transmitting unit for transmitting a rotary power from said rotation motor to said rotor while allowing said rotor to move along said rotation axis; and a straight movement transmitting unit for transmitting a straight movement power from said straight movement motor to said rotor while allowing said rotor to rotate about said rotation axis.

Preferably, said friction stir joining apparatus further comprises a receiver fixedly mounted on said support member so as to receive said object which is positioned between said rotor and said receiver; and a rotation shaft extending along said rotation axis, said rotor being mounted on said rotation shaft, said rotation transmitting unit transmitting said rotary power from said rotation motor to said rotation shaft while allowing said rotation shaft to move along said rotation axis; and said straight movement transmitting unit includes a screw shaft of hollow shape for moving said rotor straight, said rotation shaft being inserted in said screw shaft; and a nut member rotatably supported by said support member and screwed on said screw shaft so as to form a ball screw, said nut member being configured to be rotated by said straight movement motor.

Preferably, by use of at least one of said rotation control unit and said straight movement control unit, said apparatus detects whether said tip portion of said rotor is joined with said object due to fusion.

Preferably, said rotation control unit during a joining operation detects whether said rotational speed of said rotor is within a predetermined range of rotational speed or not and when said rotation control unit judges that said rotational speed is not within said predetermined range of rotational speed, said rotation control unit stops said joining operation.

Preferably, said straight movement control unit during a joining operation detects whether pressure is within a predetermined range of pressure or not and when said straight movement control unit judges that said pressure is not within said predetermined range of pressure, said straight movement control unit stops said joining operation.

Preferably, said rotation control unit changes said rotational speed of said rotor during a joining operation.

Preferably, said straight movement control unit outputs in an early stage of said joining operation a speed instruction value of triangular wave shape having an inclined wave portion which increases said rotation speed of said rotor with time.

Preferably, said straight movement control unit changes said pressure during a joining operation.

Preferably, said rotation control unit changes said rotational speed of said rotor during a joining operation; and said straight movement control unit changes said pressure during said joining operation.

Preferably, said rotation control unit changes said rotational speed of said rotor with time during said joining operation.

Preferably, said rotation control unit changes said rotational speed of said rotor during said joining operation so as to decrease said rotation speed of said rotor with time.

Preferably, said rotation control unit changes said rotational speed of said rotor during said joining operation so as to increase said rotation speed of said rotor with time.

Preferably, said rotation control unit changes said rotational speed of said rotor during said joining operation so that said rotational speed is set at high speed, low speed, and high speed in this order with time.

Preferably, said rotation control unit controls said rotational speed of said rotor during said joining operation so that said rotational speed is changed in steps or continuously with time.

Preferably, said straight movement control unit outputs in an early stage of said joining operation a speed instruction value of a wave shape having an inclined wave portion which increases said rotation speed of said rotor with time.

Preferably, said wave shape of said speed instruction is triangular.

BRIEF DESCRIPTION OF THE DRAWINGS

FIG. 1 is a drawing showing the structure of the spot joining gun 20 which is an embodiment of the present invention.

FIG. 4 is a timing chart of joining control.

DETAILED DESCRIPTION OF EMBODIMENTS

Figure 2:
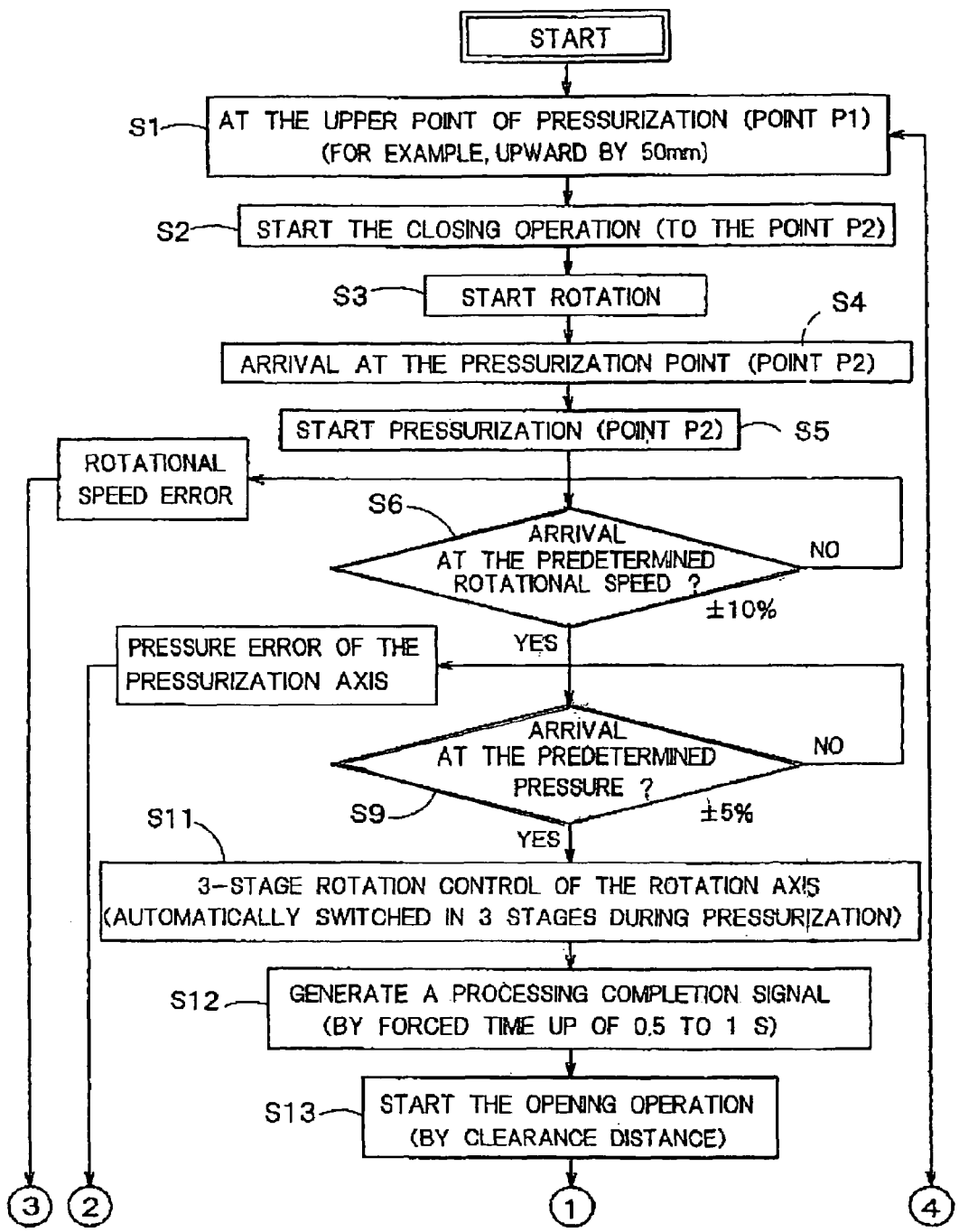
FIG. 2 is a drawing showing the first half of the flow chart of joining control of the present invention.

FIG. 1 is a drawing showing the structure of a spot joining gun 20 which is an embodiment of the friction stir joining apparatus of the present invention. The spot joining gun 20 is mounted, for example, in a wrist of a 6-axis perpendicular multi-join type robot and used for spot joining of a workpiece made of an aluminum alloy such as an aluminum body of a car by a frictional stirring method.

The spot joining gun 20 has a rotor 22, a gun arm 21 mounted on the wrist of the robot for functioning as a support member for supporting the rotor 22, a rotation motor 25 for driving the rotor 22 so as to rotate, a straight movement motor 24 for moving the rotor 22 straight, a rotation transfer unit 30 for transferring the rotary power of the rotation motor 25 to the rotor 22, and a ball screw 50 and additionally has a straight movement transfer unit 45 for transferring the straight movement force of the straight movement motor 24 to the rotor 22 and a controller 10.

The respective join axes of the robot are driven by the 6 servo motors of the first axis to the sixth axis, and the seventh axis is the straight movement motor 24 of the spot joining gun 20, and the eighth axis is the rotation motor 25 (the eighth axis may be referred to as a rotation axis). These servo motors are controlled by the controller 10. Namely, the straight movement motor 24 is controlled by a straight movement control unit 11 of the controller 10, and the rotation motor 25 is controlled by a rotation control unit 12 of the controller 10, and the respective motors of the first axis to the sixth axis are controlled by the corresponding control units of the controller 10 which are not shown in the drawing.

The rotor 22 is in a truncated cone shape and mounted to the gun arm 21 with the tip portion positioned down so as to rotate about the central axis as a rotation axis L. Further, at the tip portion of the rotor 22, a cylindrical shoulder part 51 is formed and on the bottom of the shoulder part 51, a cylindrical pin 52 having the rotation axis L as an axial center is projected downward. Further, the rotor 22 can move up and down along the rotation axis L.

On the upper part of the gun arm 21, the rotation motor 25 and the straight movement motor 24 which are realized by a servo motor are fixed, and the lower part thereof is bent in an L-shape, and a receiver 23 is fixed to the end thereof. The receiver 23 is cylindrical, and the rotation axis L is an axial center, and the top surface thereof is arranged opposite to the tip portion of the rotor 22.

The rotor 22 is held by a head 40 in a removable state and the head 40 is supported by a head support 41 via a bearing 70 so as to freely rotate about the rotation axis L. To the rotor 22, a rotation shaft 26 extending upward along the rotation axis L is fixed. Further, to the head 40, an outer cylinder, through which the rotation shaft 26 is inserted, extending upward along the rotation axis L is fixed. The outer cylinder functions as a screw shaft 27 of the ball screw 50. Therefore, the rotation shaft 26 is driven so as to rotate by the rotation motor 25, and the screw shaft 27 is moved up and down by the straight movement motor 24, thus the rotor 22 can be rotated and moved straight.

Next, the constitution of the rotation transfer unit 30 for transferring the rotation power of the rotation motor 25 to the rotation shaft 26 will be explained. The rotation transfer unit 30 has a mechanism for allowing movement of the rotor 22 in the direction of the rotation axis L of the rotation shaft 26 to which the rotor 22 is connected and transferring the rotation power of the rotation motor 25 to the rotor 22 and has a belt wheel 31 fixed to the output shaft of the rotation motor 25, a belt wheel 32 connected to the rotation shaft 26, and a ring timing belt 33 wound round the belt wheels 31 and 32. The belt wheel 31 and the rotation shaft 26 are, for example, spline-coupled and the belt wheel 32 and the rotation shaft 26 are restricted in the rotation about the rotation axis L and allowed in the movement in the direction of the rotation axis L. Therefore, by rotating power of the rotation motor 25, the rotor 22 can be driven so as to rotate in a movable state in the direction of the rotation axis L.

Next, the constitution of the straight movement transfer unit 45 will be explained. The straight movement transfer unit 45 has the ball screw 50 composed of the screw shaft 27 and a nut member 28, a belt wheel 46 fixed to the output shaft of the straight movement motor 24, a belt wheel 48 fixed to the nut member 28, and a ring timing belt 47 wound round the belt wheels 46 and 48. The screw shaft 27 of the ball screw 50 is hollow as mentioned above and the rotation shaft 26 freely passes inside it. The screw shaft 27 is supported by the gun arm 21 via a retainer 55. The retainer 55 has a plurality of balls and holds the screw shaft 27 so as to move freely in the direction of the rotation axis L with the rotation about the rotation axis L is restricted. Under the retainer 55, the nut member 28 is installed. In the outer peripheral part of the screw shaft 27, a screw groove is formed and the nut member 28 is screwed into the screw groove.

The nut member 28 is supported by the gun arm 21 via the bearing so as to freely rotate about the rotation axis L. Under the nut member 28, the belt wheel 48 is fixed and the belt wheel 48 and the nut member 28 rotate together. Therefore, when the straight movement motor 24 is rotated, the nut member 28 rotates via the timing belt 48. When the nut member 28 rotates, the screw shaft 27 moves up and down in the direction of the rotation axis L. To the lower part of the screw shaft 27, the head support 41 is fixed and to the head support 41, the head 40 for holding the rotor is connected so as to freely rotate.

When the rotation transfer unit 30 and the straight movement transfer unit 45 mentioned above are used, by rotating the rotor 22 about the rotation axis L at high speed by the rotation motor 25, it is possible to move the rotor 22 up and down along the rotation axis L and perform the open-close operation of the spot joining gun 20.

Figure 3:
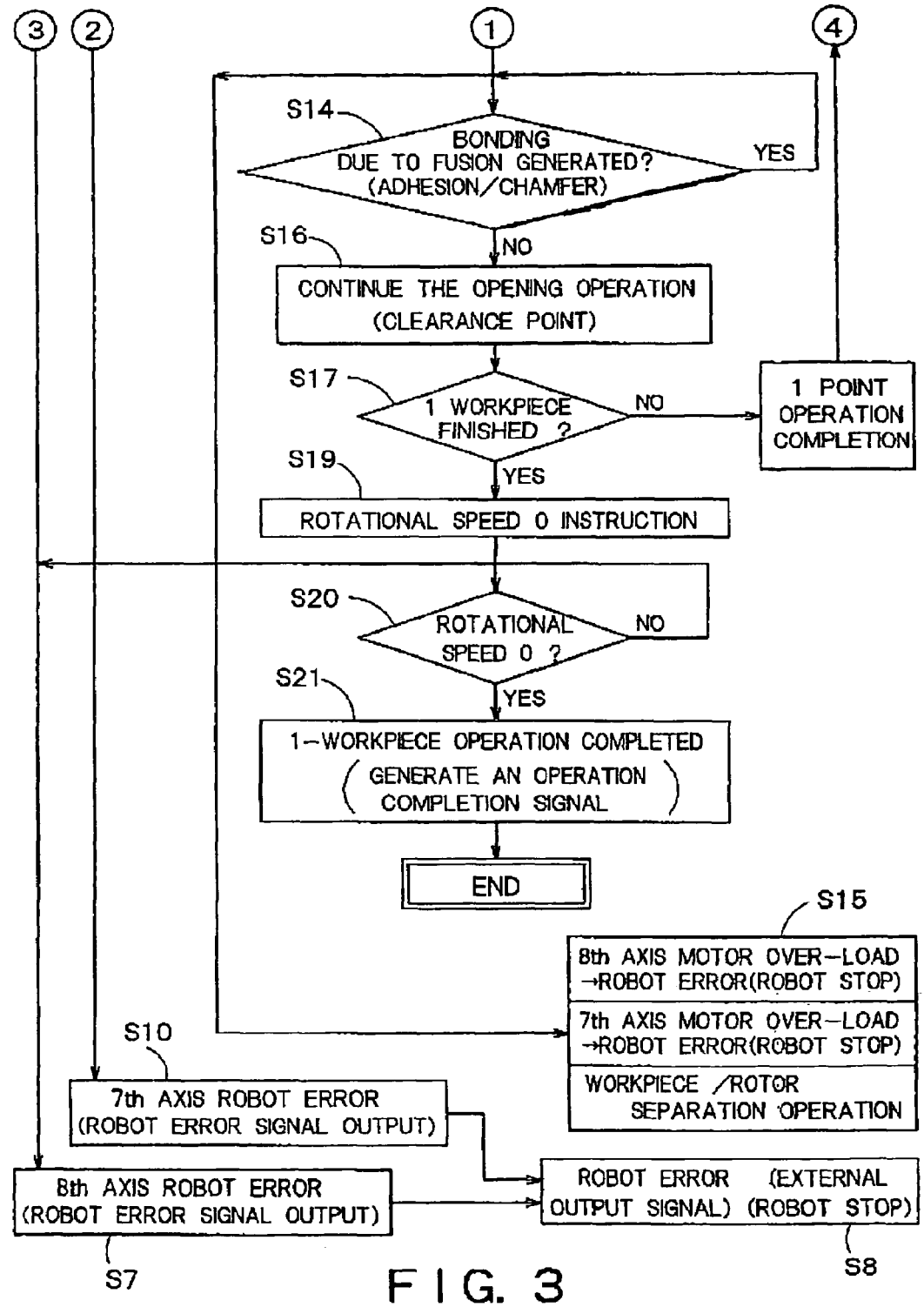
FIG. 3 is a drawing showing the latter half of the flow chart of joining control.

Next, by referring to the flow charts shown in FIGS. 2 and 3 and the timing chart shown in FIG. 4, the control method by the controller 10 during spot joining will be explained. FIG. 4(1) shows pressure, FIG. 4(2) shows a speed instruction value to the straight movement motor (the seventh axis) 24, and FIG. 4(3) shows a movement displacement instruction value to the straight movement motor (the seventh axis) 24. Further, the integral value of the speed instruction value shown in FIG. 4(2) is the movement displacement instruction value shown in FIG. 4(3) and inversely, the differential value of the movement displacement instruction value shown in FIG. 4(3) is the speed instruction value shown in FIG. 4(2). FIG. 4(4) shows a rotational speed instruction value to the rotation motor (the eighth axis) 25.

The spot joining operation executes spot joining, for example, of 2 workpieces with a thickness of about 2 mm. In this case, the two workpieces are made of an aluminum alloy and superposed and arranged almost horizontally and there are a plurality of join parts for each workpiece.

When the spot joining control is started, firstly at Step S1, the spot joining gun 2 is positioned at the position P1. The position P1 of the spot joining gun 2 is a position where, when the join part of the workpieces is set at the join point P2, the tip portion of the pin 52 of the rotor 22 is arranged at the position a predetermined distance upward from the join point P2 (for example, upward by 50 mm), and the receiver 23 of the spot joining gun 20 is arranged at the position under the join point 2 a predetermined distance downward from the workpieces.

Next, at Step S2, the closing operation of the joining gun 20 is started. Namely, at the time t1, as shown in FIG. 4, (2) and (3), a speed instruction value and a movement displacement instruction value are output to the straight movement motor 24. The reason that the speed instruction value to the straight movement motor 24 is in a triangular wave shape is to prevent that the tip portion of the rotor 22 suddenly collides with the workpiece and the workpiece vibrates.

Further, in the spot joining gun 20, only the rotor 22 moves straight and closes while the receiver 23 is fixed. Accordingly, it is necessary to move down the rotor 22 and move up the gun 20 by the robot to hold the workpiece in the vertical direction. Therefore, in the closing operation at Step S2, the rotor 22 is moved down by the straight movement motor 24 and the gun 20 is moved so as to move up in the direction of the rotation axis L of the rotor 22 using the sixth axis of the robot. In this way, the sixth axis of the robot is controlled so as to make the point of time when the tip portion of the rotor 22 makes contact with the top of the workpiece and the point of time when the receiver 23 makes contact with the bottom of the workpiece coincide with each other.

Next, at Step S3, the rotor 22 starts rotation (time t2).

Then, when the workpiece reaches the join point P2 at Step S4 (time t3), that is, the tip portion of the pin 52 of the rotor 22 makes contact with the workpiece, pressurization is started at Step S5. Thereafter, at Step S6, the rotation control unit 12 judges whether the rotation motor 25 is within a predetermined speed range or not.

In this embodiment, this judgment is executed once during the pressurization of the joining operation and at any timing during pressurization, the rotation control unit 12 detects the instantaneous value of the rotational speed. In this embodiment, as shown in FIG. 4(1), assuming each pressurization time as $t_L$, at the central point of time, that is, when $t_L/2$ elapses from the pressurization start time t3, the rotation control unit 12 detects the instantaneous value of the rotational speed. The rotational speed is designated at, for example, 3000 rpm and the predetermined rotational speed range is, for example, less than ±10% of the designated rotational speed, preferably less than ±5%. Or, instead of %, the range may be set by the number of rotations such as less than ±X rpm.

And, when the rotational speed is not within the predetermined range, as a rotational speed error, at Step S7, the rotation control unit 12 judges as a rotation motor (the eighth axis) error and outputs a robot error signal and at Step S8, the rotation control unit 12 stops all the motors of the first axis to the eighth axis and stops the robot.

When the rotation control unit 12 judges at Step S6 that the rotational speed is within the predetermined range, the process goes to Step S9 and the straight movement control unit 11 detects the instantaneous value of pressure and judges whether it is within a predetermined pressure range or not. For example, when the pressure is designated at 2.94 kN (300 kg), the predetermined pressure range is less than ±5%, preferably less than ±1%. Or, instead of %, the range may be set by the pressure such as less than Y kN. The instantaneous value of pressure is detected by detecting the current of the straight movement motor (the seventh axis) 24 by the straight movement control unit 11 and instantaneously checking the load current of the motor with the registered data. When the straight movement control unit 11 judges in this way that the pressure is not within the predetermined pressure range, as a pressure error of the pressurization axis (the seventh axis), the straight movement control unit 11 outputs a robot error signal at Step S10 and stops all the motors of the first axis to the eighth axis at Step S8.

When the straight movement control unit 11 judges at Step S9 that the pressure is within the predetermined pressure range, the process goes to Step S11. At Step S11, the rotation control unit 12, as shown in FIG. 4(4), changes the rotational speed. In the friction stir joining method, rather than by stirring at a fixed rotational speed from start of joining to end of joining, by stirring at a high rotational speed in the early stage of joining and at a low rotational speed upon completion of joining, better joining quality can be obtained. In this embodiment, as shown in FIG. 4(4), the rotational speed is switched in 3 stages, and in the early stage from the pressurization start time t3 to the time t4, the rotational speed is switched to high speed, and in the intermediate stage from the time t4 to the time t5, the rotational speed is switched to intermediate speed, and in the end stage from the time t5, the rotational speed is switched to low speed. These speeds are set by a different parameter from the reference rotational speed, 3000 rpm in this case.

When the tip portion of the pin 52 of the rotor 22 rotates at high speed in a state that it is pressed by a workpiece, frictional heat is generated between the pin 52 and the workpiece, and the join point is softened, and the pin 52 is inserted into the workpiece. The shoulder part 51 of the rotor 22 is also pressed against the workpiece surface, and frictional heat is generated also here, and the workpiece is softened and stirred. In this way, in the early stage, the workpiece is stirred at high speed, and in the intermediate stage, the rotational speed is decreased and the workpiece is stirred at intermediate speed, and in the end stage, the rotational speed is decreased more and the workpiece is stirred at low speed.

In this way, the rotational speed is switched down to low speed in a state of application of fixed pressure and then the process goes to Step S12. At Step S12, for example, a predetermined time from pressurization start is measured by an internal timer and when a predetermined time, for example, 0.5 to 1 second is measured, the processing is assumed to be completed and at the next step S13, the opening operation is started. The time at this time is the time t6.

The opening operation, as shown in FIG. 4, (2) and (3), outputs the speed instruction value and movement displacement instruction value from the straight movement control unit 12 to the straight movement motor 24 so as to move up the rotor 22. Further, at this time, the opening operation instructs the sixth axis of the robot so as to separate the tip portion of the rotor 22 and the receiver 23 from the workpiece at the same time.

At the next step S14, whether bonding due to fusion between the rotor 22 and the workpiece is generated or not is judged. Judgment of bonding generation in this embodiment is executed by the straight movement control unit 11 and the rotation control unit 12, and for example, when the current of the straight movement motor (the seventh axis) 24 detected by the straight movement control unit 11 is larger than a specified value (for example, X % of the rated torque or equivalent) or when the current of the rotation motor (the eighth axis) 25 detected by the rotation control unit 12 is larger than a specified value (for example, X % of the rated torque or equivalent), the corresponding unit judges it as a robot error, goes to Step S15, displays, for example, "Bonding due to fusion is detected" or "Collision or abnormal disturbance is detected", sounds an alarm, stops all the first axis to the eighth axis, and stops the robot. Further, the detection of bonding due to fusion may be based on the judgment of only the current of the straight movement motor 24, or it may be based on the judgment of only the current of the rotation motor 25, or it may be based on the synthetic judgment of the currents of both the motors 24 and 25.

And, the separation operation between the workpiece and the rotor is performed. The separation operation, for example, pulls up the rotor by rotating. The rotational direction of the rotor may be the same as or inverse to the rotational direction at the time of stirring joining.

The pin 52 at the tip portion of the rotor may be threaded. For example, when the pin 52 is threaded right-handed, to improve the stirring efficiency during joining, the pin 52 is rotated counterclockwise. Namely, by rotation of the screw, the peripheral base material is rotated so as to move down. Therefore, in such a case, at the time of the separation operation, the rotational direction of the rotor is not inverted and kept in the same direction as that at the time of joining. By doing this, the peripheral base material moves down and force is applied in the direction for separating the rotor. When the pin 52 is not threaded, it is preferable to separate the rotor in the opposite direction to that at the time of joining.

When no generation of fusion is judged at Step S14, the opening operation is continued at the next step S16 until the tip portion of the pin 52 of the rotor 22 is separated from the workpiece by a predetermined clearance distance.

And, at the next step S17, whether the joining of all the join parts of the workpiece is finished or not is judged, and when it is not finished, the process goes to Step S18, and the operation for one point is completed, and the next join point is set, and the process is returned to Step S1, and the joining operation for the next point is started.

When it is judged at Step S17 that the operation at all the join points of the workpiece is completed, at Step S19, the rotation control unit 12 outputs the speed indication value 0 to the rotation motor 25 and stops the rotation. At the next step S20, the rotation control unit 12 judges whether the rotational speed of the rotation motor 24 is 0 or not, and when it is 0, the process goes to Step S21, and the operation of one workpiece is completed. At Step S21, when the rotational speed does not reach 0 even if a specified time, for example, a time of 2 seconds elapses after output of the rotation stop instruction, the process goes to Step S7 and as an error of the rotation motor (the eighth axis) 25, stops the robot (Step S8).

In the aforementioned embodiment, the joining operation in one workpiece is performed without stopping the rotation of the rotor. However, the present invention is not limited to it and the rotation may be stopped at each join point or the rotation may be controlled not to stop every end of each workpiece.

Further, in this embodiment, the rotational speed at the time of pressurization is changed in 3 stages. However, the rotational speed may be changed in 2 stages or 4 or more stages and it may be controlled so as to change steplessly and continuously. Furthermore, in this embodiment, the rotational speed is controlled so as to be high in the early stage and to be reduced as the time elapses. However, the present invention is not limited to it, and depending on a workpiece, the rotational speed may be controlled so as to be low in the early stage and to be increased as the time elapses, or it may be controlled so as to be high in the early stage, low in the intermediate stage, and high again in the end stage.

Further, in this embodiment, the rotational speed is detected, assuming the pressurization time of one joining operation as $t_L$, at the central time $t_L/2$ thereof. Namely, among the speeds in the 3 stages, only whether the speed in the intermediate stage is within a predetermined speed range or not is monitored. However, the present invention is not limited to it and when the rotational speed is set in a plurality of stages, the rotational speed may be controlled so as to be monitored in each stage. Namely, a predetermined rotational speed range is set in each stage, and whether the rotational speed is within the predetermined speed range at the center of each stage or not is monitored, and at the point of time when it is judged that the rotational speed is not within the predetermined speed range, the robot may be stopped as a rotational speed error.

Further, in the aforementioned embodiment, when at least one of the rotational speed and the pressure is beyond the predetermined range, the joining operation is controlled so as to be stopped. However, the present invention is not limited to it and when one of the two is within the predetermined range, the joining operation is continued and only when both the two are beyond the predetermined range, the joining operation may be controlled so as to be stopped.

As another embodiment of the present invention, at the time of joining, not only the rotational speed but also the pressure may be controlled so as to change. For example, the pressure may be controlled so as to be high at the time of high-speed rotation in the early stage, medium at the time of intermediate-speed rotation, and low at the time of low-speed rotation in the end stage. By doing this, the joining quality can be improved more. Also in this case, in each pressurization stage, whether the pressure is within a predetermined range or not is monitored and when the pressure is not within the predetermined range, the joining operation may be controlled so as to be stopped.

Further, depending on each workpiece, the pressure may be controlled so as to be high at the time of low-speed rotation and low at the time of high-speed rotation and furthermore, the rotational speed is kept constant and only the pressure at the time of joining may be controlled so as to change.

Further, in the aforementioned embodiment, the workpieces are made of an aluminum alloy. However, the present invention is not limited to it and workpieces may be made of other metals or made of synthetic resin.

As mentioned above, according to the present invention, the friction stir joining apparatus has the rotation control unit by which the rotational speed of the rotor can be controlled variably. By doing this, spot joining can be executed at a most suitable rotational speed. Further, the straight movement control unit can finely control the pressure and can execute joining at pressure most suitable for spot joining.

Further, according to the present invention, when, for example, the rotor is rotated, the rotation control unit detects necessity of force higher than predetermined force, or when the rotor is pulled up, the straight movement control unit detects necessity of force higher than predetermined force, it can be judged that the tip portion of the rotor and an object to be joined are stuck each other due to fusion. By doing this, bonding due to fusion between the rotor and the object can be surely detected.

Further, according to the present invention, the rotational speed control is performed while judging whether the instantaneous value detected during the joining operation is within a predetermined range or not. Namely, complicated control such as adaptation control is not executed, so that the control can be simple. Even under such control of only judgment of whether the detected instantaneous value is within a predetermined range or not, in the frictional stirring spot joining, a low burst level which has no practical problems can be realized.

In the same way, the pressure control only judges whether the instantaneous value during the joining operation is within a predetermined pressure range or not, so that the control can be simple. Even under such simple control, there is no practical problem.

Further, according to the present invention, during the joining operation for pressing and joining the tip portion of the rotor to an object to be joined, the rotational speed of the rotor is changed by the rotation speed control unit, thus most suitable joining can be realized.

Further, according to the present invention, the pressure is changed during the joining operation, thus most suitable joining can be realized.

What is claimed is:

1. A friction stir joining apparatus comprising:
    a rotor having a tip portion;
    a rotation motor that rotates said rotor about a rotation axis;
    a straight movement motor that moves said rotor along said rotation axis, said tip portion of a rotating rotor being pressed against an object to be joined so that said object is softened and stirred by a frictional heat at a contact between said tip portion and said object;
    a rotation control unit that variably controls a rotational speed of said rotor based on a target value for the rotational speed along said rotation axis and controls the target value for the rotational speed to change during a joining operation before the joining operation is complete;
    a straight movement control unit that controls a straight movement of said rotor so as to control a pressure applied by said rotor to said object based on a target value for a moving speed of said rotor and controls the target value for the moving speed to change during a joining operation before the joining operation is complete;
    a support member fixedly supporting said rotation motor and said straight movement motor, said rotor being supported by said support member so as to be able to rotate about and move along said rotation axis;
    a rotation transmitting unit that transmits a rotary power from said rotation motor to said rotor while allowing said rotor to move along said rotation axis; and
    a straight movement transmitting unit that transmits a straight movement power from said straight movement motor to said rotor while allowing said rotor to rotate about said rotation axis,
    wherein the joining operation disposes said tip portion of said rotor to be pressed by the straight movement against said object.

2. The friction stir joining apparatus according to claim 1, further comprising:
    a receiver fixedly mounted on said support member so as to receive said object which is positioned between said rotor and said receiver; and
    a rotation shaft extending along said rotation axis, said rotor being mounted on said rotation shaft, said rotation transmitting unit transmitting said rotary power from said rotation motor to said rotation shaft while allowing said rotation shaft to move along said rotation axis; and
    wherein said straight movement transmitting unit includes:
    a screw shaft of hollow shape for moving said rotor straight, said rotation shaft being inserted in said screw shaft; and
    a nut member rotatably supported by said support member and screwed on said screw shaft so as to form a ball screw, said nut member being configured to be rotated by said straight movement motor.

3. The friction stir joining apparatus according to claim 1, wherein said straight movement control unit during a joining operation detects whether pressure is within a predetermined range of pressure or not and when said straight movement control unit judges that said pressure is not within said predetermined range of pressure, said straight movement control unit stops said joining operation.

4. The friction stir joining apparatus according to claim 1, wherein said straight movement control unit changes said pressure during a joining operation.

5. The friction stir joining apparatus according to claim 1, wherein the joining operation comprises positioning the tip portion, rotating the rotor, moving the rotor, contacting the object with the tip portion and softening and stirring the object with frictional heat at the contact between the tip portion and the object.

* * * * *